(12) United States Patent
Sarh (10) Patent No.: US 7,182,293 B2
(45) Date of Patent: Feb. 27, 2007

(54) AIRFOIL BOX AND ASSOCIATED METHOD (75) Inventor: Branko Sarh, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 30 days.

(21) Appl. No.: 10/832,712

(22) Filed: Apr. 27, 2004

(65) Prior Publication Data
US 2005/0236524 A1 Oct. 27, 2005

(51) Int. Cl.
B64C 3/26 (2006.01)
(52) U.S. Cl. .............. 244/123.7; 244/123.14
(58) Field of Classification Search ............ 244/123.1, 244/123.14, 123.3, 123.7
See application file for complete search history.

(56) References Cited

U.S. PATENT DOCUMENTS

| 2,241,972 A | * | 5/1941 | Wagner ............... 244/123.12 |
| 4,310,132 A | * | 1/1982 | Frosch et al. ............ 244/119 |
| 4,512,837 A | | 4/1985 | Sarh et al. |
| 4,524,556 A | | 6/1985 | Sarh et al. |
| 4,633,632 A | | 1/1987 | Sarh |
| 4,717,330 A | | 1/1988 | Sarh |
| 4,749,155 A | | 6/1988 | Hammer et al. |
| 5,225,016 A | | 7/1993 | Sarh |
| 5,735,486 A | | 4/1998 | Piening et al. |
| 6,098,260 A | | 8/2000 | Sarh |
| 6,237,873 B1 | * | 5/2001 | Amaoka et al. ......... 244/123.7 |

FOREIGN PATENT DOCUMENTS

| DE | 1 241 269 | 5/1967 |
| EP | 1 288 124 | 3/2003 |

OTHER PUBLICATIONS

Search Report for PCT/US2005/014329 dated Nov. 11, 2005.

* cited by examiner

Primary Examiner—Timothy D. Collins
(74) Attorney, Agent, or Firm—Alston & Bird LLP (57) ABSTRACT An airfoil box and associated method are provided. The airfoil box includes two or more half-shell structures. Each half-shell structure is an integral or unitary member that includes at least a portion of the outer skin of the airfoil as well as stiffener members and connection members. For example, the half-shell structures can be integrally formed of composite materials. The half-shell structures can be assembled by connecting the connection members with fasteners such as rivets to form the airfoil box.

38 Claims, 5 Drawing Sheets

AIRFOIL BOX AND ASSOCIATED METHOD

BACKGROUND OF THE INVENTION

1) Field of the Invention

The present invention relates to the manufacture of airfoils and, more particularly, to an airfoil box formed of multiple unitary partial-shell structures.

2) Description of Related Art

Certain structural parts have conventionally been manufactured by joining a number of preformed structural members. For example, in the aircraft industry, wings are often manufactured by separately forming, and then joining, one or more skins, stringers, ribs, bulkheads, and spars. The skins, which are typically large laminar members, form the outer contoured airfoil of the wing, and the stringers, ribs, bulkheads, and spars provide a stiff internal framework that supports the skins. The various members are joined by drilling holes through adjacent members and installing rivets or other fasteners in the holes. According to this conventional method, each wing includes many joined components, and each component must be joined to the others. Often, at least some of the joints must be formed manually, for example, where the joints are formed at internal locations in the wing that are difficult to access using conventional automated joining machines. The formation and fastening of the various components can be a time-consuming process. Further, the fasteners and the connection portions of the various components, which are typically overlapped for fastening, contribute to the total weight of the final wing.

Thus, there exists a continued need for an improved manufacturing process and improved parts formed thereby. The manufacturing process should reduce the number of fasteners or other joining members that must be installed, thereby potentially reducing the time for manufacture and the weight of the final product. Further, the process should be adapted for automated manufacturing processes and for use in manufacturing structural parts of different configurations.

BRIEF SUMMARY OF THE INVENTION

The present invention meets these and other needs by providing an airfoil box and associated method. The airfoil box is formed of two or more half-shell structures. Each half-shell structure is an integral or unitary member that includes at least a portion of the outer skin of the airfoil as well as stiffener members and connection members. The half-shell structures can be assembled with a reduced number of fasteners to form the airfoil box, thereby potentially reducing the weight of the box and possibly facilitating the automated manufacture of the box.

According to one embodiment, the present invention provides a method of manufacturing a box for an airfoil using first and second unitary half-shell structures. The first structure includes a first portion of the skin of the airfoil, a plurality of stiffener members such as stringers and ribs extending parallel to the skin and configured to support the skin, and a plurality of connection members defining connection flanges. Similarly, the second structure includes a second portion of the skin of the airfoil, a plurality of stiffener members such as stringers and ribs extending parallel to the second portion of the skin and configured to support the second portion of the skin, and a plurality of connection members defining connection flanges. Each of the structures can be formed of composite materials that are stitched and cured as integral structures that include the respective skin, stiffener members, and connection members. At least some of the stiffener and connection flanges of the structures correspond in position to one another. The connection flanges of the structures are connected, e.g., with fasteners, to form the box with the first and second portions of the skin of the airfoil disposed in an opposing configuration and the stiffener members disposed therebetween. Some or all of the corresponding stiffener members of the two structures can also be connected. In some cases, fittings are connected to the box at positions corresponding to the positions of the stiffener, members.

The present invention also provides a structural box for an airfoil. The box includes first and second unitary half-shell structures, each of which includes a portion of the skin, a plurality of stiffener members, and a plurality of connection members that define connection flanges. Each of the half-shell structures can be a unitary composite structure. The stiffener members and connection flanges of the two structures correspond, and a plurality of fasteners connect the connection flanges of the two structures so that the skin portions of the airfoil define a space therebetween with the stiffener members disposed in the space. The fasteners can be disposed perpendicular or parallel to the skin portions, according to the configuration of the connection flanges. Further, the connection portions can be disposed along a plane that generally defines a minimum stress for a bending moment about an axis parallel to the skin portions, e.g., along a plane substantially equidistant between the first and second skin portions. The fasteners connecting the connection members can be disposed outside an interior space defined by the skin portions and the connection members. Fasteners can also join the stiffener members of the two half-shell structures.

According to one aspect of the present invention, third and fourth unitary half-shell members are joined to a transverse end of the first and second half-shell members so that skin portions of the third and fourth half-shell members extend generally continuously with the skin portions of the first and second half-shells, respectively. Fittings can be connected to the connection members at a position corresponding to a position of at least one of the stiffener members. Additional skin portions can be connected to the transverse ends of the box to define an airfoil in conjunction with the first and second skin portions.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figures 1, 2:
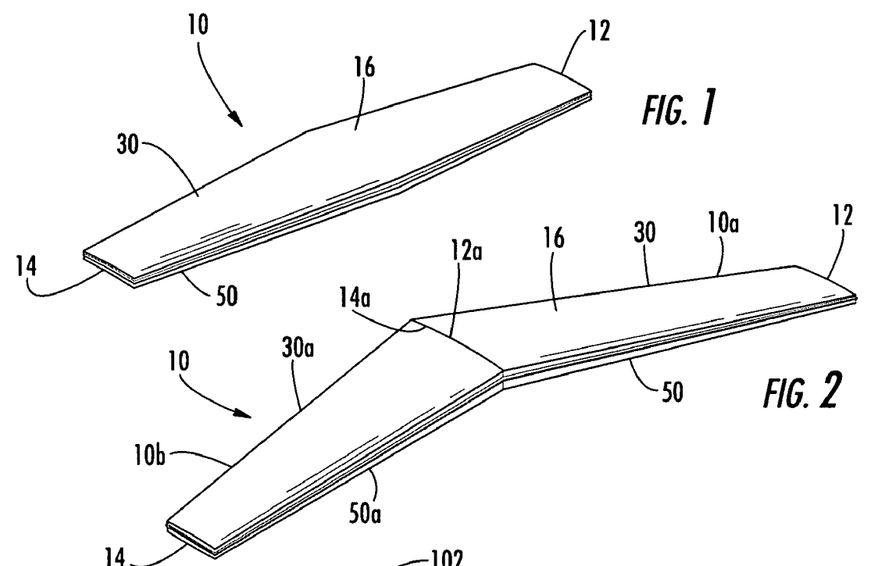
FIG. 1 is a perspective view illustrating an airfoil box according to one embodiment of the present invention.
FIG. 2 is a perspective view illustrating an airfoil box according to another embodiment of the present invention.
Figures 3, 3A:
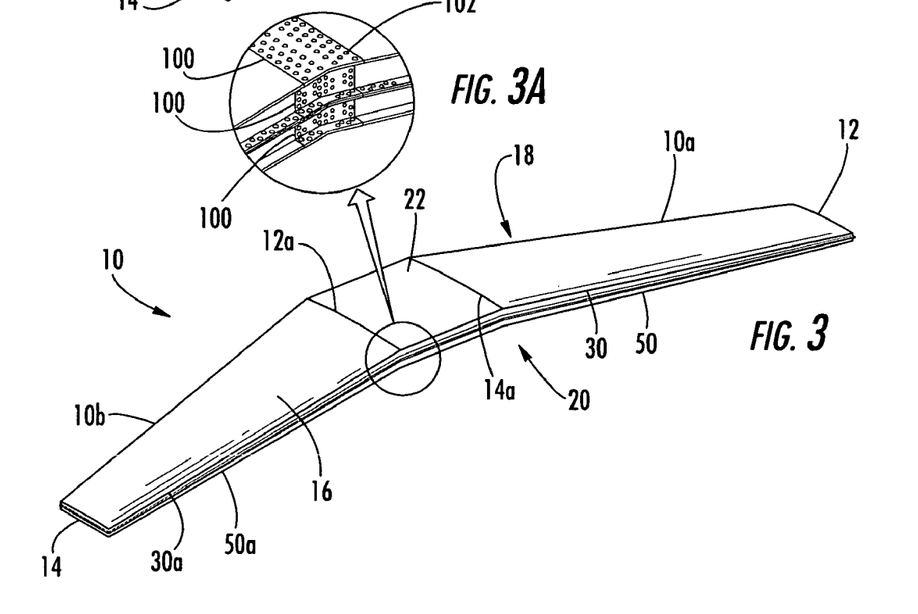
FIG. 3 is a perspective view illustrating an airfoil box according to yet another embodiment of the present invention.
FIG. 3A is an enlarged partial view in perspective illustrating a portion of the airfoil box of FIG. 3 as indicated therein.

Referring now to the figures and, in particular, to FIGS. 1–3, there are shown airfoil boxes 10 according to three embodiments of the present invention. Each of the airfoil boxes 10 extends between first and second longitudinal ends 12, 14 and defines an outer skin surface 16 therebetween. The skin surface 16 defines a cross-sectional shape that is structured so that the box 10 can be used to control stability, direction, lift, and/or thrust. For example, the airfoil boxes 10 can be used as wings of an airplane and accordingly can be structured to generate lift when moved through air. Alternatively, the airfoil boxes 10 can be used as other devices on aircraft including, for example, stabilizers, rudders, elevators, ailerons, and other control or lift devices, which can be mounted in various configurations and can be adjustable during flight. Further, the airfoil boxes 10 can be used in other embodiments of the present invention as devices for other types of vehicles including automobiles, marine vehicles, and the like.

As illustrated in FIGS. 1–3, the airfoil boxes 10 of the present invention can be formed in a variety of configurations. For example, the airfoil box 10 illustrated in FIG. 1 includes first and second half-shell structures 30, 50, each half-shell structure extending between the first and second longitudinal ends 12, 14 of the airfoil box 10. Alternatively, the compound airfoil box 10 illustrated in FIG. 2 includes first and second airfoil boxes 10a, 10b, the second end 14a of the first box 10a being connected to the first end 12a of the second box 10b such that the two airfoil boxes 10a, 10b cooperatively define the compound structure 10. The first airfoil box 10a includes first and second cooperative half-shell structures 30, 50, and third and fourth half-shell structures 30a, 50a cooperatively define the second airfoil box 10b. The compound airfoil box 10 of FIG. 3 is similar to the airfoil box 10 of FIG. 2, but further includes a central portion 22 that is disposed between the first and second airfoil boxes 10a, 10b. That is, the first and second boxes 10a, 10b of FIG. 3 are joined via the central portion 22. Thus, each airfoil box 10 can include one or more pairs of corresponding half-shell structures 30, 30a, 50, 50a. Further, while each of the half-shell structures 30, 30a, 50, 50a defines approximately half of the corresponding airfoil box 10a, 10b of the compound boxes 10 shown in FIGS. 2 and 3 (or half of the entire airfoil box 10 in the embodiment of FIG. 1), it is appreciated that each half-shell structure 30, 30a, 50, 50a need not define exactly half of the corresponding airfoil box 10, 10a, 10b. That is, some of the half-shell structures 30, 30a, 50, 50a can be larger or smaller than the other half-shell structures 30, 30a, 50, 50a.

Figure 4:
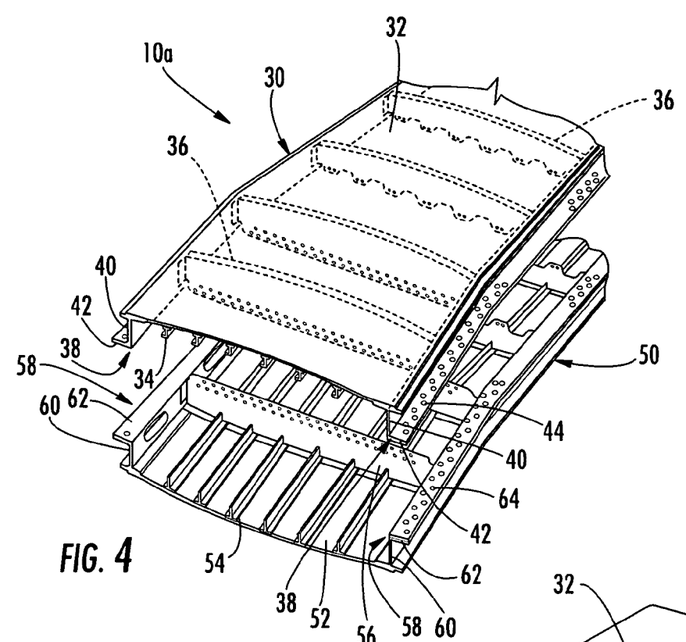
FIG. 4 is a perspective view illustrating a portion of the first and second half-shell structures of an airfoil box in an unassembled configuration.
Figure 5:
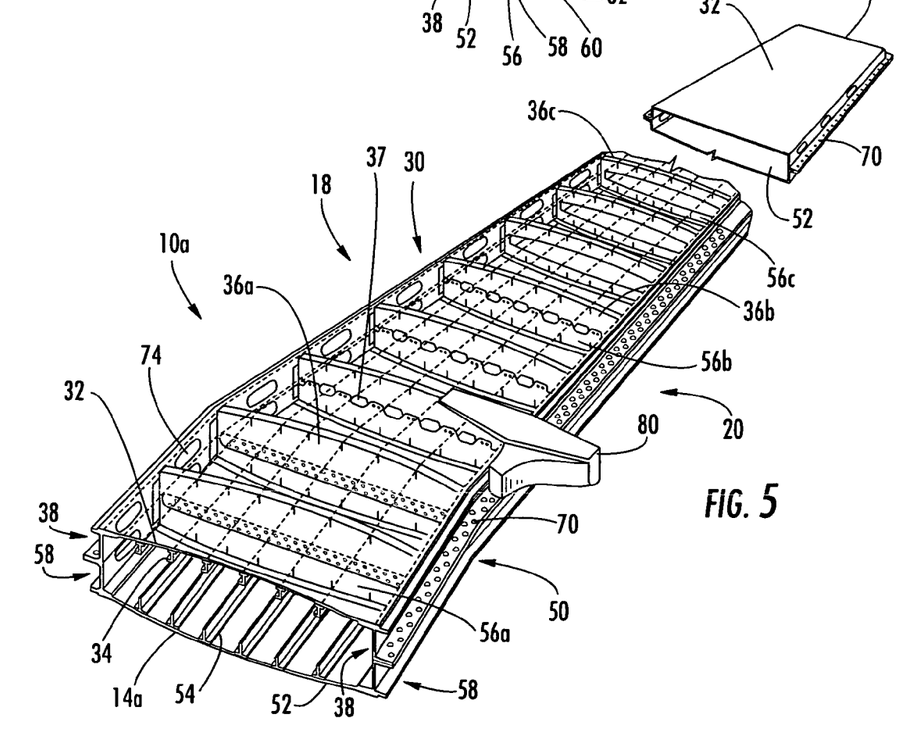
FIG. 5 is a perspective view illustrating a portion of the first and second half-shell structures of FIG. 4 in an assembled configuration.

Each of the half-shell structures 30, 30a, 50, 50a includes a skin portion that is formed as a unitary member with stiffener and connection members. For example, FIGS. 4 and 5 illustrate first and second half-shell structures 30, 50, such as can be used to form the airfoil box 10a, i.e., approximately half of the compound airfoil box 10 of FIG. 3 that can be used as an aircraft wing. The other airfoil box 10b of the wing of FIG. 3 can be substantially the same as the airfoil box 10a shown in FIGS. 4 and 5, though opposite in orientation. The first and second half-shell structures 30, 50 define first and second portions 32, 52 of the skin 16 of the airfoil box 10, respectively. The skin portions 32, 52 are generally thin, sheet-like portions that can be curved to define the desired contour of an airfoil. Each half-shell structure 30, 50 also defines stiffener members such as stringers 34, 54, or beam-like members extending in the longitudinal direction of the airfoil box 10. The stringers 34, 54 can define various cross-sectional configurations, such as an I- or T-shape that extends from the respective skin portion 32, 52 in the direction of the opposite half-shell structure 30, 50. Other stiffeners, such as bulkhead or rib members 36a, 36b, 36c, 56a, 56b, 56c also extend along each of the skins portions 32, 52. The rib members 36a, 36b, 36c and 56a, 56b, 56c are referred to collectively as 36 and 56, respectively. The rib members 36, 56 generally extend in a direction between first and second transverse ends 18, 20 of the airfoil box 10. The stiffener members 34, 36, 54, 56 support the skin portions 32, 52 in the desired configuration and prevent excessive deformation of the skin portions 32, 52, e.g., as the airfoil box 10 is stressed during flight.

In addition, each half-shell structure 30, 30a, 50, 50a includes connection members that are also formed unitarily with the skin portions. For example, as shown in FIG. 5, each connection member 38, 58 can be a spar-like member that extends longitudinally along the respective half-shell structure 30, 50. As illustrated, the connection members 38, 58 are disposed at the first and second transverse ends 18, 20 of the half-shell structures 30, 50, generally designated as the leading and trailing sides of the airfoil box 10, respectively. Each of the connection members 38, 58 extends from the same side of the respective skin portions 32, 52 as the stiffener members 34, 36, 54, 56 of the same half-shell structure 30, 50. The connection members 38, 58 define connection flanges and the connection flanges of the mating half-shell structures 30, 30a, 50, 50a correspond with one another. In particular, as shown in FIGS. 4 and 5, each connection member 38 of the first half-shell structure 30 includes a web portion 40 that extends from the skin portion 32 and a flange 42 substantially perpendicular to the web portion 40 and, thus, generally parallel to the skin portion 32. Similarly, each connection member 58 of the second half-shell structure 50 includes a web portion 60 and a flange 62. The flanges 42, 62 of the first and second half-shell structures 30, 50 can be placed in direct face-to-face contact so that rivets or other fasteners 70 can be disposed through corresponding holes 44, 64 through the flanges 42, 62. With the first and second half-shell structures 30, 50, in an assembled configuration (FIG. 5), the flanges 42, 62 are disposed outside an interior space defined between the skin portions 32, 52. That is, both ends of the holes 44, 64 through the flanges 42, 62 for receiving the fasteners 70 are accessible from the outside of the airfoil box 10. Thus, the fasteners 70 can be disposed through the flanges 42, 62 from the outside of the assembled airfoil box 10.

Figure 6:
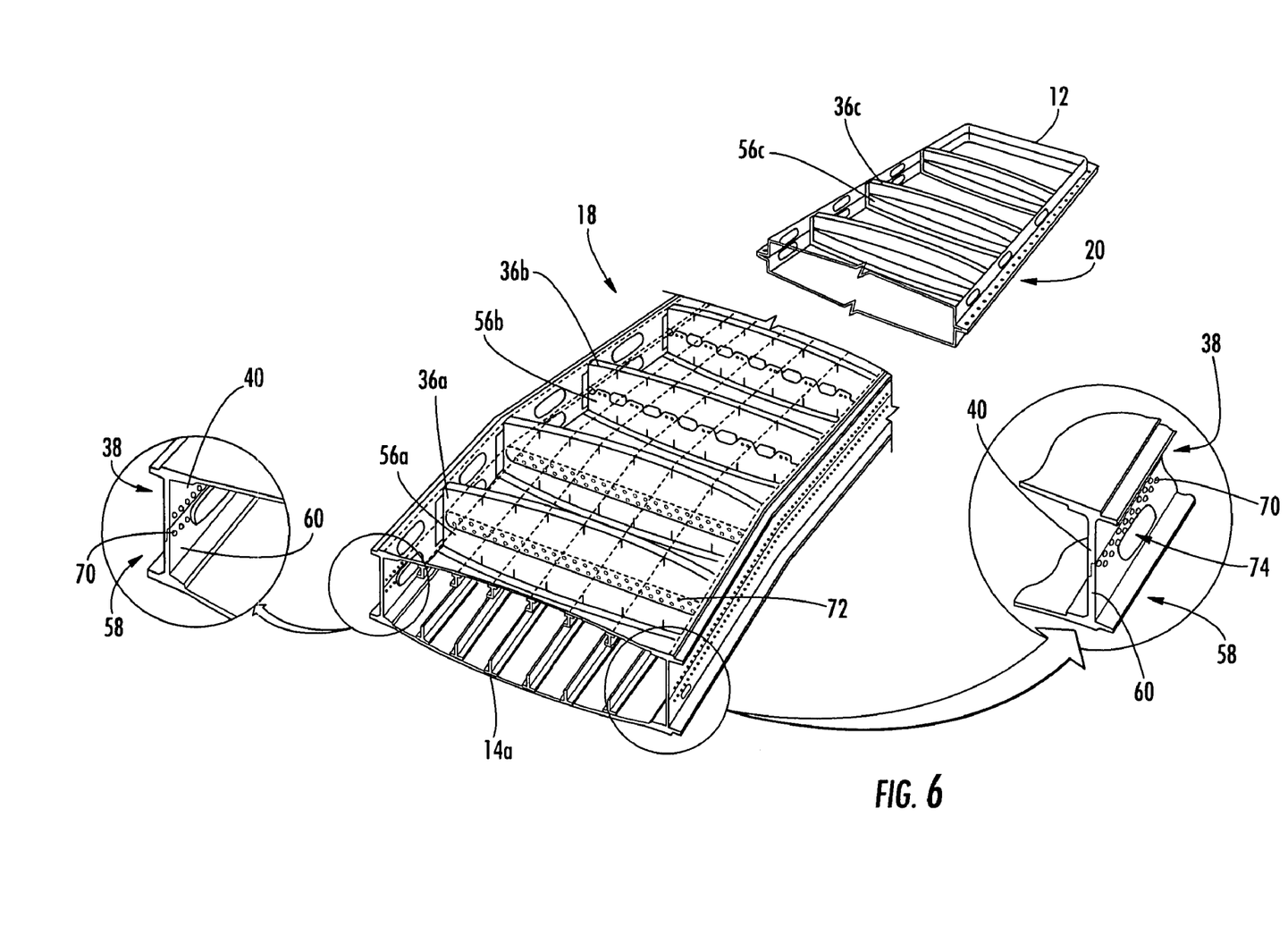
FIG. 6 is a perspective view illustrating a portion of first and second half-shell structures of an airfoil box according to another embodiment of the present invention.

The connection members 38, 58 used for connecting the half-shell structures 30, 50 can define various other configurations. For example, as shown in FIG. 6, the connection members 38, 58 can define webs 40, 60 that extend from the respective skin portions 32, 52 generally perpendicular thereto, and the webs 40, 60 can be overlapped with each other. In this configuration, one side of the holes 44, 64 through the connection members 38, 58 is accessible from the outside of the airfoil box 10, and the fasteners 70 can be disposed through the holes 44, 64 to join the connection members 30, 50. For example, blind fasteners can be disposed through the connection members 38, 58 without accessing the interior space. Alternatively, the interior space can be accessed from the ends of the airfoil box or through apertures 74 in the box 10.

The connection members 38, 58 can also extend along the longitudinal ends 12, 14 of the airfoil box 10 so that the connection members 38, 58 support the skin portions 32, 52 at the ends of the airfoil box 10 and substantially close the ends of the airfoil box 10. For example, as shown in FIG. 5, the connection members 38, 58 can extend continuously around the first end 12 of the airfoil box 10.

The stiffener members 34, 36, 54, 56 of the half-shell structures 30, 50 can also be connected. For example, as shown in FIGS. 4–6, a first plurality of the ribs 36, 56 designated by reference numerals 36a, 56a, can define an overlapping portion such that fasteners 72 can be disposed through the corresponding ribs 36a, 56a of the first and second half-shell structures 30, 50. In some cases, multiple rows of the fasteners 72 can be disposed through the overlapping portions to engage the corresponding ribs 36a, 56a and, hence, the two half-shell structures 30, 50. Each of a second plurality of the ribs 36b, 56b defines a tab portion that is configured to be joined to a tab portion of the corresponding rib 36b, 56b of the opposite half-shell structure 30, 50. Each tab portion can extend from the rib 36b, 56b toward the opposite half-shell structure 30, 50. Thus, the overlapping tab portions can be joined by the fasteners 72 while the portions of each rib 36b, 56b between the tabs need not overlap and can instead define a space 37 between the ribs 36b, 56b, thereby reducing the material and weight of each rib 36b, 56b. Finally, a third plurality of the ribs 36c, 56c can be configured to remain unjoined. That is, the ribs 36c, 56c can provide stiffness to the half-shell structures 30, 50 but are not connected to one another. Typically, ribs that are joined along their entire length, such as the first ribs 36a, 56a, provide more strength than other configurations of ribs, and ribs that are unjoined provide less strength. Thus, as shown in FIGS. 4–6, the unjoined ribs 36c, 56c are located at the first end 12 of the airfoil box 10a where lower loads on the airfoil box 10a are anticipated. The first ribs 36a, 56a are located near the opposite end 14a of the airfoil box 10a that is nearest the point of connection between the airfoil box 10a and the central box portion 22 or aircraft and where the maximum loads are anticipated. However, in other configurations, the ribs 36, 56 can have other configurations, such as all of the ribs 36, 56 being either joined or unjoined.

Figure 7:
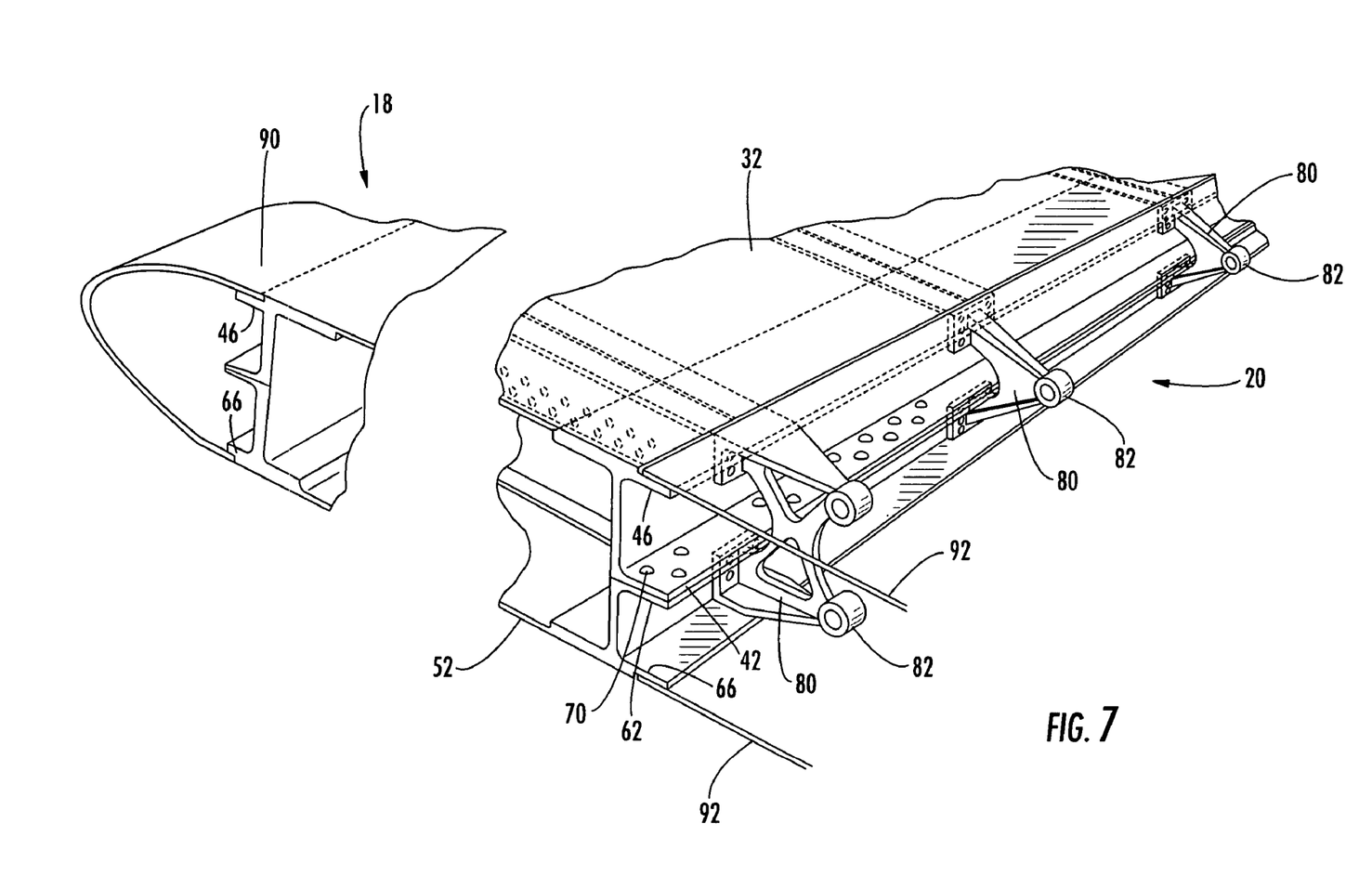
FIG. 7 is a perspective view illustrating a portion of the airfoil box of FIG. 5, shown with fittings attached thereto.

Fittings 80 can be provided on the airfoil box 10 for connecting additional components to the box 10a. As shown in FIG. 7, the fittings 80 can be attached to each of the connection members 38, 58 of the first and second half-shell structures 30, 50 such that the fittings 80 extend from the trailing transverse end 20 of the airfoil box 10a. Each fitting 80 can define an attachment portion, such as an aperture or a hinge-type connector 82, to which additional components can be connected. Thus, the additional components can be connected to the fittings 80 and, hence, the airfoil box 10a. For example, the additional components can be flight control devices such as ailerons that are rotatably connected to the airfoil box 10a by the fittings 80.

As illustrated in FIG. 7, additional skin portions 90, 92 can be attached to the leading and trailing ends 18, 20 of the airfoil box 10a so that the skin portions 32, 52, 90, 92 in combination define a continuous cross-sectional airfoil shape as desired. A skin portion can also be provided for covering the first longitudinal end 12 of the box 10a. The skin portions 32, 52, 90, 92 can be joined to the connection members 38, 58, e.g., to flanges 46, 66 extending parallel to the skin portions 32, 52 and recessed slightly therefrom so that the outer surfaces of the leading and trailing skin portions 90, 92 are flush with the skin portions 32, 52. The leading and trailing side skin portions 90, 92 can define spaces between the airfoil box 10a, in which the fittings 80 can fit. Further, the skin portions 90, 92 can define openings, e.g., through which equipment such as ailerons connected to the fittings 80 on the trailing side 20 of the airfoil box 10a can be advanced and retracted.

Each of the first and second half-shell structures 30, 30a, 50, 50a can be formed as unitary members and subsequently joined by rivets or other fasteners as described above. For example, where the half-shell structures 30, 30a, 50, 50a are formed of composite materials, the skin portions 32, 52, stiffeners 34, 36, 54, 56 and connection members 38, 58 of each half-shell structure can be constructed of a flexible reinforcement material, and the reinforcement material can then be stiffened with a matrix material that impregnates the reinforcement material and is cured to a stiff configuration. For example, the reinforcement material of each half-shell structure 30, 30a, 50, 50a can be provided as fibrous pieces or strands, tows, woven or nonwoven mats, and the like, and can be any of a variety of fibrous materials such as fiberglass, metal, minerals, conductive or nonconductive graphite or carbon, nylon, aramids such as Kevlar®, a registered trademark of E. I. du Pont de Nemours and Company, and the like. Matrix materials include thermoplastic or thermoset polymeric resins. Exemplary thermosetting resins include allyls, alkyd polyesters, bismaleimides (BMI), epoxies, phenolic resins, polyesters, polyurethanes (PUR), polyurea-formaldehyde, cyanate ester, and vinyl ester resin. Exemplary thermoplastic resins include liquid-crystal polymers (LCP); fluoroplastics, including polytetrafluoroethylene (PTFE), fluorinated ethylene propylene (FEP), perfluoroalkoxy resin (PFA), polychlorotrifluoroethylene (PCTFE), and polytetrafluoroethylene-perfluoromethylvinylether (MFA); ketone-based resins, including polyetheretherketone (PEEK™, a trademark of Victrex PLC Corporation, Thorntons Cleveleys Lancashire, UK); polyamides such as nylon-6/6, 30% glass fiber; polyethersulfones (PES); polyamide-imides (PAIS); polyethylenes (PE); polyester thermoplastics, including polybutylene terephthalate (PBT), polyethylene terephthalate (PET), and poly(phenylene terephthalates); polysulfones (PSU); and poly(phenylene sulfides) (PPS).

In some cases, the reinforcement material can be provided as a preimpregnated material, i.e., preimpregnated with the uncured matrix material. Alternatively, the matrix material can be disposed, e.g., as a sheet of resinous material according to a stitching/resin film infusion (S/RFI) process, after the reinforcement material has been stitched or otherwise joined in the desired configuration. Alternatively, the matrix material can be disposed in the reinforcement material by a process of resin transfer molding (RTM), in which a vacuum is used to dispose the matrix material in the reinforcement material. For example, according to one conventional RTM process, a reinforcement material, which can be formed of multiple stitched portions, is placed in a press between upper and lower tools. The press is closed by adjusting the tools together and adjusting the reinforcement material to a desired shape defined by the surfaces of the tools. A partial vacuum is then formed between the tools to pull the resin into the space between the tools to flood the reinforcement material. The reinforcement and matrix materials are then heated to cure the matrix material. After sufficient curing, the tools can be opened and the cured part is removed. In another conventional RTM process, the reinforcement material is instead adjusted to the desired shape by urging the reinforcement material against one tool with a vacuum bag. That is, the reinforcement material is disposed between the tool and the vacuum bag, and the space between the bag and the tool is then evacuated. As described above, the partial vacuum is used to pull the resin or other matrix material into the reinforcement material. The matrix material can be cured using an autoclave or oven. In any case, the reinforcement material can be stitched or otherwise joined while the reinforcement material is still flexible, e.g., using a stitching machine that performs a sewing operation to join the various portions of each half-shell structure 30, 30a, 50, 50a.

Subsequent to the stitching or otherwise joining of the portions of each half-shell structure 30, 30a, 50, 50a, the matrix material of each half-shell structure 30, 30a, 50, 50a can be cured substantially together, i.e., so that each half-shell structure 30, 30a, 50, 50a is cured integrally to form a unitary composite member. Curing is generally performed by subjecting the composite material to heat and/or pressure. Where the half-shell structures 30, 30a, 50, 50a are formed as unitary members, rivets or other fasteners generally are not required for connecting the skin portions 32, 52 and stiffener and connection members 34, 36, 54, 56 of each half-shell structure 30, 30a, 50, 50a. Thereafter, the first and second half-shell structures 30, 30a, 50, 50a can be connected with fasteners 70, 72 as described above to form the airfoil box 10.

As illustrated in FIG. 5, the second end 14a of the first box 10a, i.e., the root end of the first box 10a, is configured to be connected to the central box portion 22, the opposite box 10b or directly to a fuselage of an aircraft so that the first longitudinal end 12, or tip, extends from the fuselage. For example, as shown in FIG. 3A, plates 100 or other overlapping members can be provided for connecting each of the portions 10a, 10b of the compound airfoil boxes 10 to one another and/or for connecting each of the airfoil boxes 10a, 10b to the fuselage of the aircraft. Each plate 100 can be connected to the respective airfoil box portion 10a, 10b and/or the fuselage by a plurality of rivets or other fasteners 102. That is, the fasteners 102 can be disposed through each plate 100 and one of the members of each of the airfoil boxes 10a, 10b being joined. For example, as shown in FIG. 3A, the plates 100 can be disposed in an overlapping configuration with the skin portions 16 of different airfoil boxes 10a, 10b, and additional plates 100a can overlap the proximate connection portions 38, 58 of the airfoil boxes 10a, 10b being joined.

Figures 8A, 8B:
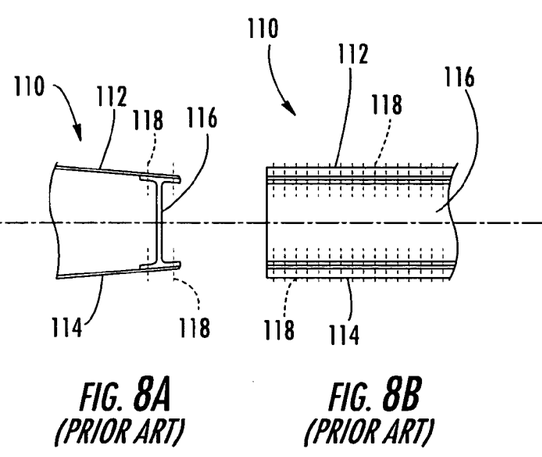
FIG. 8A is a partial section view in elevation illustrating a conventional airfoil.
FIG. 8B is a partial side view of the conventional airfoil of FIG. 8A.
Figure 8C:
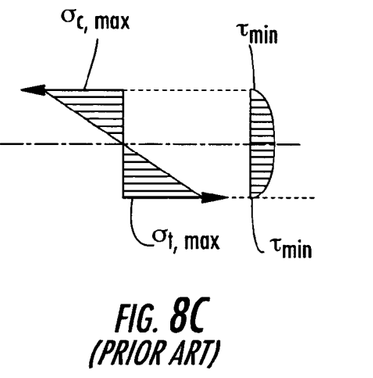
FIG. 8C is a graph illustrating typical stress distributions on the conventional airfoil of FIGS. 8A and 8B.

FIGS. 8A–8C illustrate the distribution of stress on a conventional airplane wing 110. A portion of the wing 110 is shown in FIGS. 8A and 8B. The wing 110 has an upper skin 112 and a lower skin 114, which are connected by a beam-like spar member 116 that extends longitudinally through the wing 110. Dashed lines 118 indicate the position of rivets disposed through the upper skin 112 and an upper flange of the spar 116 and through the lower skin 114 and a lower flange of the spar 116. Thus, each rivet is positioned near the top or bottom of the wing 110. FIG. 8C illustrates the typical compressive/tensile and shear stresses that result in the wing 110 when the wing 110 is subjected to a bending moment or load, i.e., a typical load during flight for a wing attached to a fuselage of an airplane. In particular, the typical bending load is applied about an axis substantially parallel to the upper and lower skins 112, 114 (i.e., an axis directed into the page, as shown in FIG. 8B). As shown in FIG. 8C, a maximum compressive stress $\sigma_{c,\,max}$ occurs at the top of the wing 110, and a maximum tensile stress $\sigma_{t,\,max}$ occurs at the bottom of the wing 110. A minimum shear stress $\tau_{min}$ occurs at the top and bottom of the wing 110, though the shear stress is generally much lower in magnitude than the compressive and tensile stresses. Thus, the rivets connecting the skins 112, 114 to the spar 116 are subjected to high stresses.

Figure 9A:
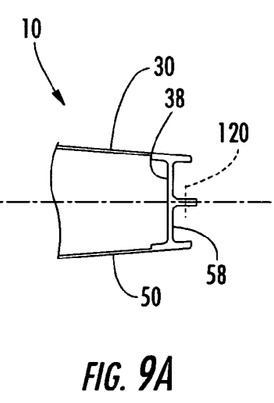
FIG. 9A is a partial section view in elevation illustrating an airfoil according to one embodiment of the present invention.
Figure 9B:
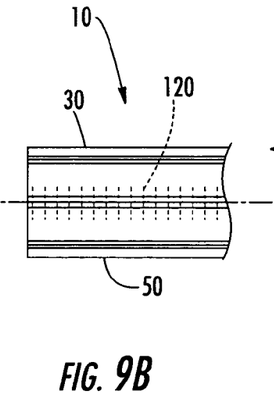
FIG. 9B is a partial side view of the airfoil of FIG. 9A as seen from the right side of FIG. 9A.
Figure 9C:
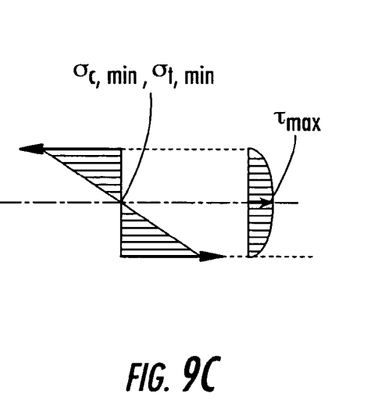
FIG. 9C is a graph illustrating typical stress distributions on the airfoil of FIGS. 9A and 9B.

FIGS. 9A–9C illustrate the distribution of stress on an airfoil box 10 according to one embodiment of the present invention. The airfoil box 10 includes first and second half-shell structures 30, 50 that are connected by fasteners such as rivets at locations designated by dashed lines 120. FIG. 9C illustrates the typical compressive/tensile stresses and shear stresses that result in the airfoil box 10 when subjected to the same type of bending load illustrated in FIGS. 8A–8C. The fasteners are located at a position generally coinciding with minimum compressive and tensile stresses $\sigma_{c,\,min}$, $\sigma_{t,\,min}$, i.e., in a plane that substantially coincides with a neutral axis where tension and compression forces are zero. Although a maximum shear stress $\sigma_{t,\,max}$ occurs at the location of the fasteners, the magnitude of the shear stress is generally much lower than the compressive and tensile stresses. Thus, the fasteners connecting the two half-shell structures 30, 50 are subjected to lower stresses than the rivets described in connection with FIGS. 8A–8C. While the connection flanges 38, 58 and, hence, the fasteners of the airfoil box 10 shown in FIGS. 9A and 9B are positioned along a plane equidistant from the skin portions 32, 52, it is appreciated that the connection flanges 38, 58 can be otherwise configured, e.g., to correspond to other positions of low stress in cases where the airfoil box 10 is subjected to a stress distribution that is different than that illustrated in FIG. 9C. That is, the fasteners can be disposed in a plane that generally corresponds to a neutral axis where compressive and tensile stresses are zero, the location of the neutral axis being determined according to the geometry of the box 10 and the application of forces, thereto. In any case, a reduction in stress at the position of the fasteners can result in a stronger airfoil box 10 and/or a reduction in the number of fasteners required for joining.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of manufacturing a box for an airfoil having an outer skin, the method comprising:

forming a first unitary half-shell structure of composite material, the first unitary half-shell structure comprising a first portion of the skin of the airfoil, a plurality of stiffener members extending parallel to the first portion of the skin and configured to support the first portion of the skin, and a plurality of connection members defining connection flanges;

forming a second unitary half-shell structure of composite material, the second unitary half-shell structure comprising a second portion of the skin of the airfoil, a plurality of stiffener members extending parallel to the second portion of the skin and configured to support the second portion of the skin, and a plurality of connection members defining connection flanges, each stiffener member of the second half-shell structure corresponding in position to a respective one of the stiffener members of the first half-shell structure, and each connection flange of the second half-shell structure corresponding in position to a respective one of the connection flanges of the first half-shell structure; and connecting each connection flange of the second half-shell structure to the corresponding connection flange of the first half-shell structure, thereby forming the box with the first and second portions of the skin of the airfoil disposed in an opposing configuration and the stiffener members disposed therebetween, wherein said first forming step comprises stitching the stiffener and connection members of the first half-shell structure to the first portion of the skin of the airfoil and curing a matrix material of the first portion of the skin and the stiffener and connection members of the first half-shell structure substantially together, wherein said second forming step comprises stitching the stiffener and connection members of the second half-shell structure to the second portion of the skin of the airfoil and curing a matrix material of the second portion of the skin and the stiffener and connection members of the second half-shell structure substantially together.

2. A method according to claim 1 wherein each of said first and second forming steps occurring prior to said connecting step.

3. A method according to claim 1 wherein said first and second forming steps and said connecting step comprise manufacturing a first box and, further comprising:

repeating said first and second forming steps and said connecting step to form a second box; and connecting the second box to the first box so that an outer skin of the second box extends generally continuously with the outer skin of the first box.

4. A method according to claim 1 wherein said connecting step comprises disposing a plurality of fasteners through the corresponding connection flanges of the first and second half-shell structures.

5. A method according to claim 4 wherein said connecting step comprises disposing the fasteners in a direction substantially perpendicular to the skin portions.

6. A method according to claim 4 wherein said connecting step comprises disposing the connection portions in an overlapping configuration and disposing the fasteners in a direction substantially parallel to the skin portions.

7. A method according to claim 4 wherein said connecting step comprises disposing the connection portions along a plane substantially equidistant between the first and second skin portions.

8. A method according to claim 4 wherein said connecting step comprises disposing the connection portions along a plane generally defining a minimum stress for a bending moment applied to the airfoil about an axis generally parallel to the skin portions.

9. A method according to claim 1 further comprising connecting at least one of the stiffener members of the second half-shell structure to the corresponding stiffener member of the first half-shell structure.

10. A method according to claim 1 wherein said connecting step comprises disposing a plurality of fasteners outside an interior space of the box defined by the skin portions and the connection members.

11. A method according to claim 1 wherein said first and second forming steps comprise integrally forming at least one stringer and at least one rib with each of the half-shell structures, each stringer extending in a longitudinal direction of the box, each rib extending in a transverse direction perpendicular to the longitudinal direction, and each connection member extending in the longitudinal direction of the box.

12. A method according to claim 1 further comprising connecting at least one fining to the box, each fining being connected to at least one of the connection members at a position corresponding to a position of at least one of the stiffener members.

13. A method of manufacturing a box for an airfoil having an outer skin, the method comprising:

forming a first unitary half-shell structure comprising a first portion of the skin of the airfoil, a plurality of stiffener members extending parallel to the first portion of the skin and configured to support the first portion of the skin, and a plurality of connection members defining connection flanges;

forming a second unitary half-shell structure comprising a second portion of the skin of the airfoil, a plurality of stiffener members extending parallel to the second portion of the skin and configured to support the second portion of the skin, and a plurality of connection members defining connection flanges, each stiffener member of the second half-shell structure corresponding in position to a respective one of the stiffener members of the first half-shell structure, and each connection flange of the second half-shell structure corresponding in position to a respective one of the connection flanges of the first half-shell structure; and connecting each connection flange of the second half-shell structure directly to the corresponding connection flange of the first half-shell structure, thereby forming the box with the first and second portions of the skin of the airfoil disposed in an opposing configuration and the stiffener members disposed therebetween, wherein said first forming step comprises stitching the stiffener and connection members of the first half-shell structure to the first portion of the skin of the airfoil and curing a matrix material of the first portion of the skin and the stiffener and connection members of the first half-shell structure substantially together, and wherein said second forming step comprises stitching the stiffener and connection members of the second half-shell structure to the second portion of the skin of the airfoil and curing a matrix material of the second portion of the skin and the stiffener and connection members of the second half-shell structure substantially together.

14. A method according to claim 13 wherein said first and second forming steps comprise forming the first and second half-shell structures as unitary structures of composite materials.

15. A method according to claim 14 wherein each of said first and second forming steps occurring prior to said connecting step.

16. A method according to claim 13 wherein said first and second forming steps and said connecting step comprise manufacturing a first box and, further comprising:
repeating said first and second forming steps and said connecting step to form a second box; and
connecting the second box to the first box so that an outer skin of the second box extends generally continuously with the outer skin of the first box.

17. A method according to claim 13 wherein said connecting step comprises disposing a plurality of fasteners through the corresponding connection flanges of the first and second half-shell structures.

18. A method according to claim 17 wherein said connecting step comprises disposing the fasteners in a direction substantially perpendicular to the skin portions.

19. A method according to claim 17 wherein said connecting step comprises disposing the connection portions in an overlapping configuration and disposing the fasteners in a direction substantially parallel to the skin portions.

20. A method according to claim 17 wherein said connecting step comprises disposing the connection portions along a plane substantially equidistant between the first and second skin portions.

21. A method according to claim 17 wherein said connecting step comprises disposing the connection portions along a plane generally defining a minimum stress for a bending moment applied to the airfoil about an axis generally parallel to the skin portions.

22. A method according to claim 13 further comprising connecting at least one of the stiffener members of the second half-shell structure to the corresponding stiffener member of the first half-shell structure.

23. A method according to claim 13 wherein said connecting step comprises disposing a plurality of fasteners outside an interior space of the box defined by the skin portions and the connection members.

24. A method according to claim 13 wherein said first and second forming steps comprise integrally forming at least one stringer and at least one rib with each of the half-shell structures, each stringer extending in a longitudinal direction of the box, each rib extending in a transverse direction perpendicular to the longitudinal direction, and each connection member extending in the longitudinal direction of the box.

25. A method according to claim 13 further comprising connecting at least one fitting to the box, each fitting being connected to at least one of the connection members at a position corresponding to a position of at least one of the stiffener members.

26. A method of manufacturing a box for an airfoil having an outer skin, the method comprising:
forming a first unitary half-shell structure comprising a first portion of the skin of the airfoil, a plurality of stiffener members extending parallel to the first portion of the skin and configured to support the first portion of the skin, and a plurality of connection members defining connection flanges;
forming a second unitary half-shell structure comprising a second portion of the skin of the airfoil, a plurality of stiffener members extending parallel to the second portion of the skin and configured to support the second portion of the skin, and a plurality of connection members defining connection flanges, each stiffener member of the second half-shell structure corresponding in position to a respective one of the stiffener members of the first half-shell structure, and each connection flange of the second half-shell structure corresponding in position to a respective one of the connection flanges of the first half-shell structure;
connecting each connection flange of the second half-shell structure directly to the corresponding connection flange of the first half-shell structure, thereby forming the box with the first and second portions of the skin of the airfoil disposed in an opposing configuration and the stiffener members disposed therebetween; and
connecting at least one of the stiffener members of the second half-shell structure directly to the corresponding stiffener member of the first half-shell structure.

27. A method according to claim 26 wherein said first and second forming steps comprise forming the first and second half-shell structures as unitary structures of composite materials.

28. A method according to claim 26 wherein said first forming step comprises stitching the stiffener and connection members of the first half-shell structure to the first portion of the skin of the airfoil and curing a matrix material of the first portion of the skin and the stiffener and connection members of the first half-shell structure substantially together, and wherein said second forming step comprises stitching the stiffener and connection members of the second half-shell structure to the second portion of the skin of the airfoil and curing a matrix material of the second portion of the skin and the stiffener and connection members of the second half-shell structure substantially together, each of said first and second forming steps occurring prior to said first connecting step.

29. A method according to claim 26 wherein said first and second forming steps and said first connecting step comprise manufacturing a first box and, further comprising:
repeating said first and second forming steps and said first connecting step to form a second box; and
connecting the second box to the first box so that an outer skin of the second box extends generally continuously with the outer skin of the first box.

30. A method according to claim 26 wherein said first connecting step comprises disposing a plurality of fasteners through the corresponding connection flanges of the first and second half-shell structures.

31. A method according to claim 30 wherein said first connecting step comprises disposing the fasteners in a direction substantially perpendicular to the skin portions.

32. A method according to claim 30 wherein said first connecting step comprises disposing the connection portions in an overlapping configuration and disposing the fasteners in a direction substantially parallel to the skin portions.

33. A method according to claim 30 wherein said first connecting step comprises disposing the connection portions along a plane substantially equidistant between the first and second skin portions.

34. A method according to claim 30 wherein said first connecting step comprises disposing the connection portions along a plane generally defining a minimum stress for a bending moment applied to the airfoil about an axis generally parallel to the skin portions.

35. A method according to claim 26 further comprising connecting at least one of the stiffener members of the second half-shell structure to the corresponding stiffener member of the first half-shell structure.

36. A method according to claim 26 wherein said first connecting step comprises disposing a plurality of fasteners outside an interior space of the box defined by the skin portions and the connection members.

37. A method according to claim 26 wherein said first and second forming steps comprise integrally forming at least one stringer and at least one rib with each of the half-shell structures, each stringer extending in a longitudinal direction of the box, each rib extending in a transverse direction perpendicular to the longitudinal direction, and each connection member extending in the longitudinal direction of the box.

38. A method according to claim 26 further comprising connecting at least one fitting to the box, each fitting being connected to at least one of the connection members at a position corresponding to a position of at least one of the stiffener members.

* * * * *